(12) United States Patent
Takikawa et al.

(10) Patent No.: US 9,709,127 B2
(45) Date of Patent: Jul. 18, 2017

(54) STARTING DEVICE

(71) Applicant: AISIN AW CO., LTD., Anjo-shi, Aichi-ken (JP)

(72) Inventors: Yoshihiro Takikawa, Tsushima (JP); Akihiro Nagae, Anjo (JP); Kazuto Maruyama, Nishio (JP)

(73) Assignee: AISIN AW CO., LTD., Anjo-shi (JP)

( * ) Notice: Subject to any disclaimer, the term of this patent is extended or adjusted under 35 U.S.C. 154(b) by 385 days.

(21) Appl. No.: 14/410,172

(22) PCT Filed: Aug. 2, 2013

(86) PCT No.: PCT/JP2013/071042
§ 371 (c)(1),
(2) Date: Dec. 22, 2014

(87) PCT Pub. No.: WO2014/021458
PCT Pub. Date: Feb. 6, 2014

(65) Prior Publication Data
US 2015/0323041 A1      Nov. 12, 2015

(30) Foreign Application Priority Data

Aug. 2, 2012   (JP) ................................. 2012-171815

(51) Int. Cl.
*F16F 15/14*     (2006.01)
*F16H 45/02*     (2006.01)

(52) U.S. Cl.
CPC ........... *F16F 15/145* (2013.01); *F16H 45/02* (2013.01); *F16H 2045/0205* (2013.01);
(Continued)

(58) Field of Classification Search
None
See application file for complete search history.

(56) References Cited

U.S. PATENT DOCUMENTS 5,174,423 A * 12/1992 Tsukamoto ............. F16H 45/02
                                                    192/3.29
6,193,611 B1 * 2/2001 Hanke ....................... F16D 3/80
                                                    192/208
(Continued)

FOREIGN PATENT DOCUMENTS

DE    10 2011 101 137 A1    2/2012
JP       2011-504987 A      2/2011
(Continued)

OTHER PUBLICATIONS

International Search Report for PCT/JP2013/071042 dated Sep. 10, 2013.

*Primary Examiner* — Colby M Hansen
(74) *Attorney, Agent, or Firm* — Sughrue Mion, PLLC

(57) ABSTRACT

In a starting device including a centrifugal-pendulum vibration absorbing device, while lock-up is released, a flow of working oil directed from a lock-up piston side toward a damper mechanism is produced in a clutch engagement chamber. A thrust force in the axial direction directed from the lock-up piston toward the damper mechanism is applied to a weight, of a mass body of the centrifugal-pendulum vibration absorbing device, disposed on the lock-up piston side. A support member of the centrifugal-pendulum vibration absorbing device is provided with weight support protrusions that project in the axial direction of an input shaft of a speed change device toward the weight disposed on the lock-up piston side.

9 Claims, 6 Drawing Sheets

(52) U.S. Cl.
CPC .......... *F16H 2045/0226* (2013.01); *F16H 2045/0263* (2013.01); *F16H 2045/0294* (2013.01)

(56) References Cited

U.S. PATENT DOCUMENTS

| | | | |
|---|---|---|---|
| 2010/0200347 A1* | 8/2010 | Engelmann | F16F 15/145 188/378 |
| 2010/0242466 A1 | 9/2010 | Krause et al. | |
| 2011/0099992 A1 | 5/2011 | Magerkurth et al. | |
| 2012/0111683 A1 | 5/2012 | Ito et al. | |
| 2013/0150169 A1 | 6/2013 | Krause et al. | |

FOREIGN PATENT DOCUMENTS

| | | |
|---|---|---|
| WO | 2010/000220 A1 | 1/2010 |
| WO | 2011/110168 A1 | 9/2011 |
| WO | 2012/043677 A1 | 4/2012 |

\* cited by examiner

STARTING DEVICE

CROSS REFERENCE TO RELATED APPLICATIONS

This application is a National Stage of International Application No. PCT/JP2013/071042 filed Aug. 2, 2013, claiming priority based on Japanese Patent Application No. 2012-171815 filed Aug. 2, 2012, the contents of all of which are incorporated herein by reference in their entirety.

TECHNICAL FIELD

An embodiment is described that relates to a starting device including, for example, a centrifugal-pendulum vibration absorbing device.

BACKGROUND ART

Hitherto, there has been known a starting device including a pump impeller, a turbine runner, a lock-up clutch, a spring damper mechanism, and so forth in addition to a centrifugal-pendulum damper (centrifugal-pendulum vibration absorbing device) having a flange (support member) and a pendulum (mass body) (see Patent Document 1, for example). In the starting device, a piston of the lock-up clutch and a front cover define a clutch disengagement chamber to which a clutch disengagement pressure is supplied. In addition, the piston of the lock-up clutch is coupled to an input element of the damper mechanism, and the piston and the input element define a clutch engagement chamber to which a clutch engagement pressure regulated independently of the clutch disengagement pressure is supplied. The centrifugal-pendulum vibration absorbing device is disposed in the clutch engagement chamber, and surrounded by the lock-up piston and the input element of the damper mechanism from the front cover side (engine side) in the axial direction and the radially outer side. Consequently, in the starting device, a working fluid from the lock-up chamber is not allowed to flow into the clutch engagement chamber when the lock-up clutch is disengaged to suppress application of a thrust force in the axial direction due to the working fluid flowing from the lock-up chamber to the centrifugal-pendulum vibration absorbing device.

There is also known a centrifugal-pendulum vibration absorbing device including a plurality of mass bodies each composed of two weights provided to face each other via a support member attached coaxially to a rotary element and coupled to each other (see Patent Document 2, for example). In the centrifugal-pendulum vibration absorbing device, a guide opening portion is formed in each of the support member and the weight, and a roller is guided by both the guide opening portion of the support member and the guide opening portion of the weights to allow swing of the mass body along a track determined in advance and thus the swing range of the mass body is determined. In addition, the two weights are coupled to each other by a fixation member that penetrates a notch formed in the support member so as to be positioned near both end portions of the mass bodies. Further, a separation member (protrusion) is formed in proximity to the fixation member on a support member side-surface of each weight, and the separation member determines a gap (minimum gap) between the weight and the support member.

RELATED-ART DOCUMENTS

Patent Documents

[Patent Document 1] International Publication No. 2012/043677 (WO/2012/043677) (FIG. 4)

[Patent Document 2] German Patent Application Publication No. 10 2011 101 137 A1 (DE 10 2011 101 137 A1)

SUMMARY OF THE DISCLOSURE

In the starting device described in Patent Document 1, however, in the case where the lock-up clutch is disengaged, the pendulum (mass body) may exhibit unstable behavior such as a tilt relative to the axis of the flange of the centrifugal-pendulum vibration absorbing device and a shake relative to the flange immediately after rotation of the flange is started and immediately before such rotation is stopped, that is, when the flange rotates at a significantly low rotational speed even if the flow of the working fluid in the clutch engagement chamber is gentle, and the pendulum may collide against the flange to generate abnormal sound. Patent Document 2 discloses that the separation member (protrusion) which determines the minimum gap between the weight and the support member is provided on the support member side-surface of the weight, but does not disclose at all behavior of the weights (mass bodies) that occurs when the support member rotates at a significantly low rotational speed.

Thus, one object is to provide a starting device including a centrifugal-pendulum vibration absorbing device in which behavior of mass bodies that occurs when a support member of the centrifugal-pendulum vibration absorbing device rotates at a significantly low rotational speed is stabilized with a simple configuration.

The starting device described herein is characterized by including, for example:
- a front cover coupled to a motor of a vehicle;
- a pump impeller joined to the front cover;
- a turbine runner disposed to face the pump impeller and coupled to an input shaft of a transmission;
- a lock-up clutch having a lock-up piston that defines a lock-up chamber together with the front cover;
- a damper mechanism including an input element that is coupled to the lock-up piston and that defines a clutch engagement chamber that opposes the lock-up chamber together with the lock-up piston, an output element coupled to the input shaft of the transmission, and a spring disposed between the input element and the output element; and
- a centrifugal-pendulum vibration absorbing device disposed in the clutch engagement chamber and coupled to the damper mechanism, in which:
the lock-up clutch engages and disengages the front cover and the input element of the damper mechanism with and from each other in accordance with a pressure difference between a clutch disengagement pressure supplied to the lock-up chamber and a clutch engagement pressure regulated independently of the clutch disengagement pressure and supplied to the clutch engagement chamber;
a gap that allows a working fluid from the lock-up chamber to flow into the engagement chamber is formed at a coupling portion between the lock-up piston and the input element;
the damper mechanism is disposed on the turbine runner side with respect to the centrifugal-pendulum vibration absorbing device and the gap;
the centrifugal-pendulum vibration absorbing device includes a support member that is coupled to the damper mechanism and that extends in parallel with a clutch engagement chamber side-surface of the lock-up piston, multiple mass bodies each including two weights that face each other via the support member and that are coupled to each other, and a guide roller that rolls on inner peripheral surfaces of a first notch portion formed in the support member and a weight-side notch portion formed in the weight;

one of the support member and the weight disposed on the lock-up piston side has a protrusion that projects toward the other in an axial direction of the input shaft; and the support member and the weight disposed on the damper mechanism side do not have another protrusion that projects in the axial direction at a position that is symmetrical with respect to the protrusion about a plane that is orthogonal to an axis of the input shaft and that passes through a center, in a thickness direction, of a portion of the support member interposed between the two weights.

In the starting device, the front cover and the input element of the damper mechanism, that is, the input shaft of the speed change device, can be engaged with each other by making the clutch engagement pressure supplied to the clutch engagement chamber higher than the clutch disengagement pressure supplied to the lock-up chamber. On the other hand, the front cover and the input element of the damper mechanism, that is, the input shaft of the speed change device, can be disengaged from each other by making the clutch disengagement pressure supplied to the lock-up chamber higher than the clutch engagement pressure supplied to the clutch engagement chamber. When the lock-up clutch is disengaged in this way, the working fluid supplied to the lock-up chamber flows into the clutch engagement chamber, that is, into a space around the centrifugal-pendulum vibration absorbing device, from the gap formed at the coupling portion between the lock-up piston and the input element of the damper mechanism, and flows out through the spring of the damper mechanism. In the starting device, in addition, a pressure on the side of the turbine runner and the pump impeller with respect to the damper mechanism is reduced by rotation of the turbine runner etc. Consequently, when the lock-up clutch is disengaged, a flow of the working fluid directed from the lock-up piston side toward the damper mechanism is produced in the clutch engagement chamber, and a thrust force in the axial direction directed from the lock-up piston side toward the damper mechanism is applied to the weight, of the mass body of the centrifugal-pendulum vibration absorbing device, disposed on the lock-up piston side.

Consequently, it is possible to press the weight on the lock-up piston side toward the support member using the thrust force and keep the protrusion in abutment with the weight or the support member by producing a flow of the working fluid directed from the lock-up piston side toward the damper mechanism around the centrifugal-pendulum vibration absorbing device in the clutch engagement chamber when the lock-up clutch is released, and by providing one of the support member and the weight disposed on the lock-up piston side with the protrusion which projects in the axial direction of the input shaft toward the other. Consequently, it is possible to favorably suppress a tilt of each mass body relative to the axis of the support member and a shake of each mass body relative to the support member when the support member rotates at a significantly low rotational speed while the lock-up clutch is disengaged. In the starting device, in addition, the direction of the thrust force applied to the mass body (the weight on the lock-up piston side) when the lock-up clutch is disengaged is generally constant. Thus, it is not necessary to provide a protrusion having the function discussed above on the weight disposed on the damper mechanism side or a damper mechanism side-surface of the support member. Thus, the support member and the weight disposed on the damper mechanism side do not have another protrusion that projects in the axial direction at the position that is symmetrical with respect to the protrusion about the plane that is orthogonal to the axis of the input shaft and that passes through the center, in a thickness direction, of the portion of the support member interposed between the two weights. Consequently, the support member and the mass bodies of the centrifugal-pendulum vibration absorbing device can be formed easily, and the configuration of each member can be simplified. As a result, with the starting device, behavior of the mass bodies that occurs when the support member of the centrifugal-pendulum vibration absorbing device rotates at a significantly low rotational speed can be stabilized with a simple configuration.

The protrusion may be provided on the support member so as to project toward the weight disposed on the lock-up piston side. Consequently, the protrusion can be formed easily compared to a case where a protrusion is formed on the weight.

The first notch portion of the support member may have a larger opening area than the weight-side notch portion of the weight; and the protrusion may project toward the weight disposed on the lock-up piston side at a location on a circumferential end portion side of the mass body with respect to the first notch portion. Consequently, the protrusion can be favorably prevented from falling into the weight-side notch portion, and smooth swing of the mass body can be secured.

Two guide rollers may be provided for each of the mass bodies, and spaced from each other; two first notch portions may be provided for each of the mass bodies, and disposed symmetrically about a swing center line of the mass body; a plurality of recessed portions that are depressed toward a center of the support member may be formed in the support member so as to interpose the two first notch portions for each of the mass bodies; and the protrusion may project toward the weight disposed on the lock-up piston side from a location between the first notch portion and the recessed portion.

The mass bodies each may include a coupling member that couples the two weights to each other and that has a cushioning member; the support member may include a second notch portion that permits movement of the coupling member and that abuts against the cushioning member of the coupling member to determine a swing range of the mass body; and the protrusion may project toward the weight disposed on the lock-up piston side from a location between the first notch portion and the second notch portion.

In such a centrifugal-pendulum vibration absorbing device, each mass body moves along a track determined in advance with the guide rollers guided by the first notch portion and the weight-side notch portion, and the swing range of the mass body is determined by abutment of the second notch portion and the cushioning member of the coupling member in abutment. Thus, the second notch portion and the cushioning member of the coupling member abut against each other to mitigate a collision of the guide rollers against the support member, that is, the first notch portion, thereby suppressing generation of abnormal sound along with swing of the mass body. In the starting device including the centrifugal-pendulum vibration absorbing device, when the lock-up clutch is disengaged, the weight can be supported by the protrusion projecting from a location between the first notch portion and the second notch portion even if the thrust force is applied to each mass body and one of the weights is pushed against the support member. As a result, it is possible to prevent the cushioning member of the coupling member from bumping into the second notch portion on one side because of movement (deformation) of the one of the weights, and to favorably maintain the function of the cushioning member to mitigate a collision. Further, the weight does not have a notch portion around the coupling member. Thus, with the protrusion projecting toward the weight from the support member having the first and second notch portions, the weight pushed against the support member can be favorably supported by the protrusion. Thus, with the centrifugal-pendulum vibration absorbing device, it is possible to favorably suppress generation of abnormal sound along with swing of the mass bodies and to keep an adequate gap between the two weights constituting the mass body and the support member.

The protrusion may be disposed in closer proximity to the second notch portion than the first notch portion. Consequently, movement (deformation) in the axial direction of the weight around the coupling member can be favorably suppressed when the thrust force is applied to each mass body while the lock-up clutch is disengaged. Thus, it is possible to favorably prevent the cushioning member from bumping into the second notch portion on one side because of movement (deformation) of the weight.

Two guide rollers may be provided for each of the mass bodies, and spaced from each other; two coupling members may be provided for each of the mass bodies, and positioned on both sides of the two guide rollers; two first notch portions may be provided for each of the mass bodies, and disposed symmetrically about a swing center line of the mass body; and two second notch portions may be provided for each of the mass bodies, and positioned on both sides of the two first notch portions.

PREFERRED EMBODIMENTS

Now, an exemplary embodiment will be described with reference to the drawings.

Figure 1:
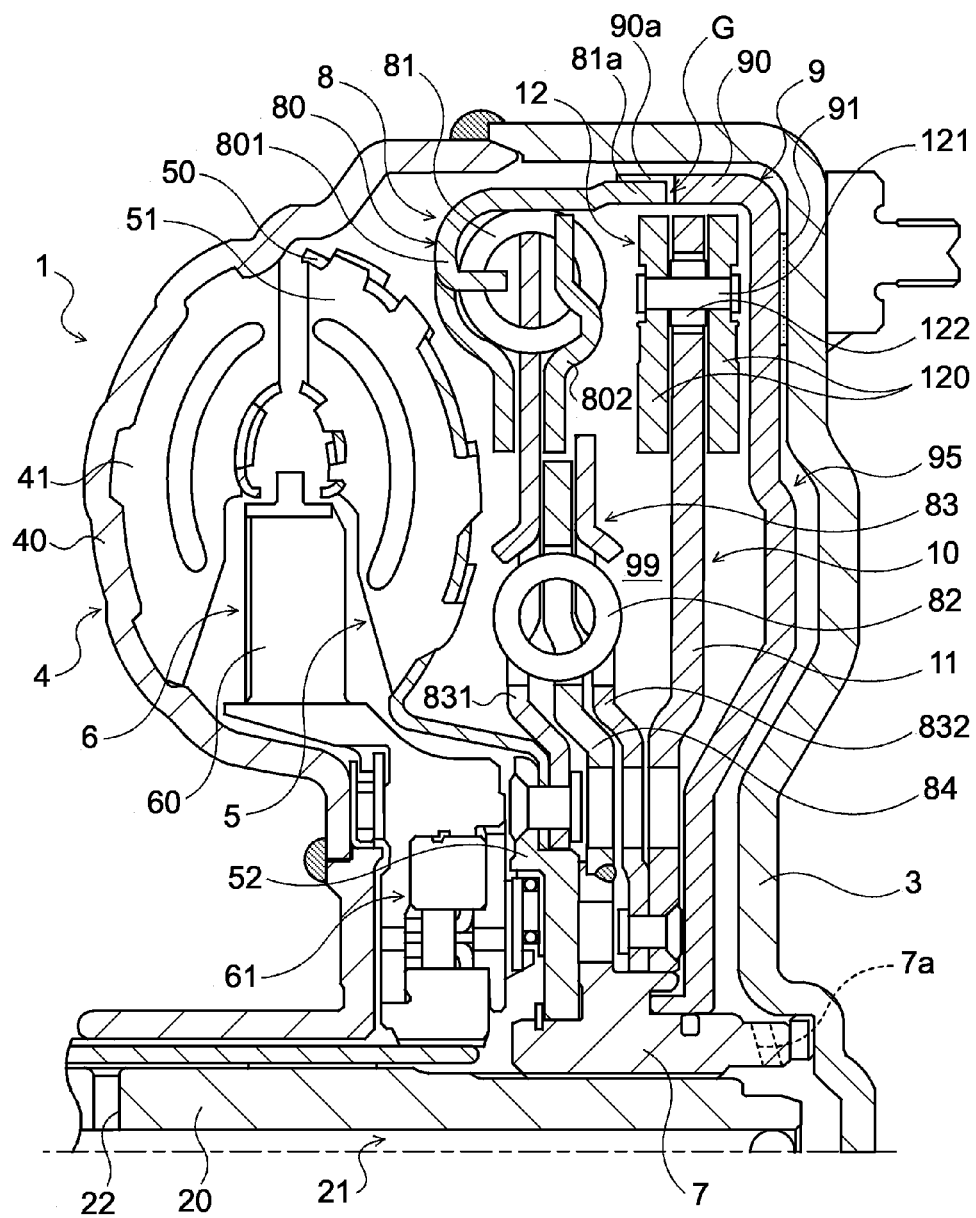
FIG. 1 is a schematic diagram illustrating the configuration of a starting device according to an exemplary embodiment.

FIG. 1 is a schematic diagram illustrating the configuration of a starting device 1 according to an exemplary embodiment. The starting device 1 illustrated in the drawing is mounted on a vehicle including an engine (internal combustion engine) serving as a motor, and transmits power from the engine to a speed change device (not illustrated) that is an automatic transmission (AT) or a continuously variable transmission (CVT). The starting device 1 includes a front cover (input member) 3 coupled to a crankshaft of the engine, a pump impeller (input-side fluid transmission element) 4 joined to the front cover 3, a turbine runner (output-side fluid transmission element) 5 disposed to face the pump impeller 4 and coupled to an input shaft 20 of the speed change device, a stator 6 that adjusts a flow of working oil (working fluid) from the turbine runner 5 to the pump impeller 4, a damper hub (output member) 7 fixed to the input shaft 20 of the speed change device, a damper mechanism 8 connected to the damper hub 7, a single-plate friction lock-up clutch mechanism 9 having a lock-up piston 90 coupled to the damper mechanism 8, and a centrifugal-pendulum vibration absorbing device 10.

The pump impeller 4 and the turbine runner 5 face each other. The stator 6 is disposed between and coaxially with the pump impeller 4 and the turbine runner 5 so as to be rotatable. The pump impeller 4, the turbine runner 5, and the stator 6 form a torus (annular flow passage) that allows circulation of working oil, and function as a torque converter with a torque amplification function. The pump impeller 4 has a pump shell 40 tightly fixed to the front cover 3, and a plurality of pump blades 41 disposed on the inner surface of the pump shell 40. The turbine runner 5 has a turbine shell 50, a plurality of turbine blades 51 disposed on the inner surface of the turbine shell 50, and a turbine hub 52 connected to the turbine shell 50 via a rivet and rotatably supported by the damper hub 7. The stator 6 has a plurality of stator blades 60. The rotational direction of the stator 6 is set to only one direction by a one-way clutch 61. In the starting device 1, the stator 6 and the one-way clutch 61 may be omitted, and the pump impeller 4 and the turbine runner 5 may function as a fluid coupling.

The damper mechanism 8 has a drive member 80 serving as an input element that is rotatable together with the lock-up piston 90 of the lock-up clutch mechanism 9, a plurality of first coil springs (first elastic bodies) 81, an intermediate member (intermediate element) 83 engaged with the drive member 80 via the first coil springs 81, a plurality of second coil springs (second elastic bodies) 82 having rigidity (spring constant) that is higher than the rigidity of the first coil springs 81, for example, and disposed apart from the first coil springs 81 in the radial direction of the starting device 1, and a driven member (output element) 84 engaged with the intermediate member 83 via the second coil springs 82.

The drive member 80 includes a first member 801 and a second member 802 that are coupled to each other and hold the plurality of first coil springs 81. The first member 801 and the second member 802 each have a plurality of abutment portions. Each of the abutment portions abuts against a first end of the corresponding first coil spring 81. The intermediate member 83 includes: an annular first intermediate plate (first member) 831 and an annular second intermediate plate (second member) 832. The first intermediate plate 831 is disposed on the pump impeller 4 side (speed change device side) and has a plurality of abutment portions. Each of the abutment portions abuts against a second end of the corresponding first coil spring 81. The second intermediate plate 832 is disposed on the front cover 3 side (engine side).

In the embodiment, the first and second intermediate plates 831, 832 are arranged in the axial direction of the starting device 1 with the driven member 84 provided therebetween, and coupled to each other via a rivet (not illustrated) to hold the plurality of second coil springs 82. In addition, the first and second intermediate plates 831, 832 each have a plurality of abutment portions. Each of the abutment portions abuts against a first end of the corresponding second coil spring 82. The first intermediate plate 831 is fitted with the outer peripheral portion of the turbine hub 52 with backlash, and fixed to the turbine hub 52 via a rivet together with the turbine shell 50. This enables the first intermediate plate 831 and the second intermediate plate 832, and the turbine shell 50 and the turbine hub 52, to rotate together with each other. The driven member 84 has a plurality of abutment portions. Each of the abutment portions abuts against a second end of the corresponding second coil spring 82. The driven member is fixed to the damper hub 7 by welding.

The lock-up clutch mechanism 9 operates on a hydraulic pressure from a hydraulic control device (not illustrated). The lock-up clutch mechanism 9 establishes and releases lock-up in which the front cover (input member) 3 and the damper hub 7, that is, the input shaft 20 of the speed change device, are coupled to each other via the damper mechanism 8. The starting device 1 may be configured to include a multi-plate friction lock-up clutch mechanism in place of the single-plate friction lock-up clutch mechanism 9. The lock-up piston 90 constituting the lock-up clutch mechanism 9 is formed to be annular, and supported by the damper hub 7 so as to be movable in the axial direction and rotatable. An annular friction material 91 is affixed to a front cover side-surface of the lock-up piston 90 on the outer peripheral side. Further, the outer peripheral portion of the lock-up piston 90 to which the drive member 80 discussed above is coupled is formed in a short tube shape.

Figure 2:
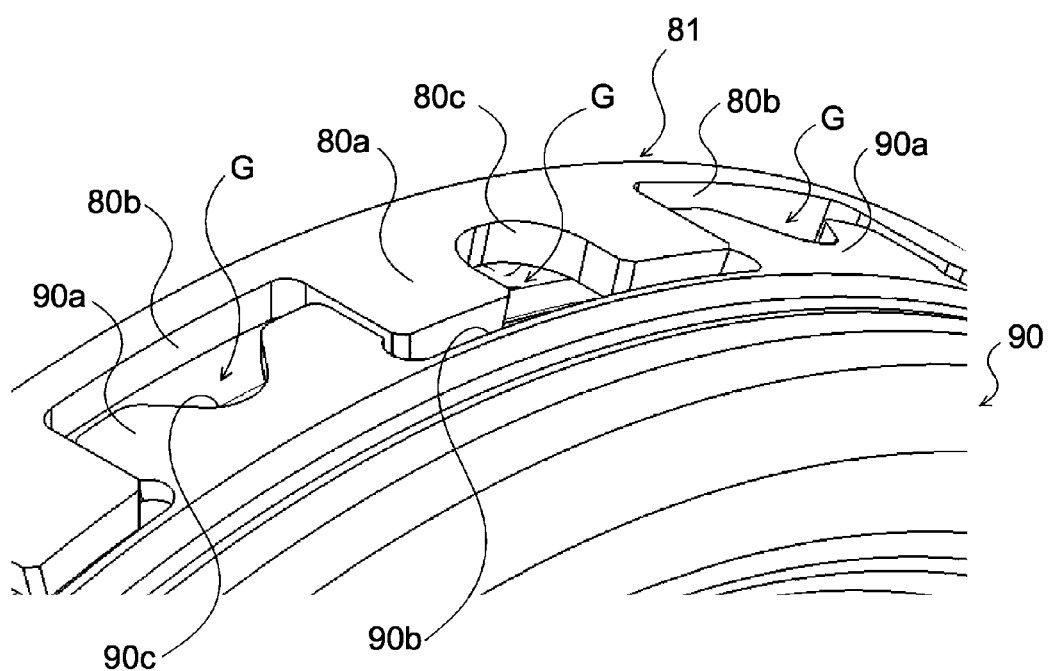
FIG. 2 is an enlarged perspective view illustrating the coupling structure between a lock-up piston and a drive member of a damper mechanism in the starting device of FIG. 1.

In the starting device 1 according to the embodiment, as illustrated in FIG. 2, a plurality of engagement projecting portions 90a are formed on the outer peripheral portion of the lock-up piston 90 at intervals, and engagement recessed portions 90b are formed between adjacent engagement projecting portions 90a. In addition, the outer peripheral portion of the drive member 80 is also formed in a tubular shape. A plurality of engagement projecting portions 80a are formed on the outer peripheral portion of the drive member 80 at intervals, and engagement recessed portions 80b are formed between adjacent engagement projecting portions 80a. The lock-up piston 90 and the drive member 80 are coupled (fitted) so as to rotate together with each other by fitting the engagement projecting portions 90a of the lock-up piston 90 into the respective engagement recessed portions 80b of the drive member 80 and fitting the engagement projecting portions 80a of the drive member 80 into the respective engagement recessed portions 90b of the lock-up piston 90. A clearance (backlash) that permits movement of the lock-up piston 90 in the axial direction is formed between the engagement projecting portions 90a of the lock-up piston 90 and the engagement recessed portions 80b of the drive member 80, and between the engagement projecting portions 80a of the drive member 80 and the engagement recessed portions 90b of the lock-up piston 90. Further, as illustrated in FIG. 2, a notch 90c is formed in each engagement projecting portion 90a of the lock-up piston 90, and a notch 80c is formed in each engagement projecting portion 80a of the drive member 80. Consequently, a plurality of gaps (openings) G for communication between the inside and the outside are formed by the notches 80c, 90c at the coupling portion between the lock-up piston 90 and the drive member 80.

In this way, the outer peripheral portion of the lock-up piston 90 can be reduced in weight by forming the plurality of engagement recessed portions 90b in the outer peripheral portion of the lock-up piston 90 and forming the notch 90c in each engagement projecting portion 90a. Similarly, the outer peripheral portion of the drive member 80 can be reduced in weight by forming the plurality of engagement recessed portions 80b in the outer peripheral portion of the drive member 80 and forming the notch 80c in each engagement projecting portion 80a. Consequently, a centrifugal force that acts on the outer peripheral portions of the lock-up piston 90 and the drive member 80 can be reduced to improve the durability of the outer peripheral portions of the lock-up piston 90 and the drive member 80.

In addition, the lock-up piston 90 defines a lock-up chamber 95 together with the front cover 3. Working oil from the hydraulic control device (not illustrated), that is, a clutch disengagement pressure, is supplied into the lock-up chamber 95 via an oil passage 7a formed in the damper hub 7 etc. Further, the lock-up piston 90 defines a clutch engagement chamber 99 that opposes the lock-up chamber 95 together with the drive member 80 of the damper mechanism 8 coupled to the lock-up piston 90. Working oil from the hydraulic control device, that is, a clutch engagement pressure (circulation pressure), is supplied to the clutch engagement chamber 99 via a supply oil passage 21 and an oil hole 22 formed in the input shaft 20 of the speed change device and an oil passage (not illustrated). Consequently, if working oil is discharged from the lock-up chamber 95 by the hydraulic control device (not illustrated) (the clutch disengagement pressure is reduced to be less than the clutch engagement pressure), the lock-up piston 90 is moved toward the front cover 3, and the friction material 91 affixed to the lock-up piston 90 is brought into press contact with the front cover 3, which causes the front cover 3 to be coupled (directly coupled) to the damper hub 7 via the damper mechanism 8. If the clutch disengagement pressure for the lock-up chamber 95 is increased to be higher than the clutch engagement pressure by the hydraulic control device, lock-up is released. Working oil supplied to the clutch engagement chamber 99 is also supplied to a torus defined by the pump impeller 4, the turbine runner 5, and the stator 6 through gaps between the springs of the damper mechanism 8 etc. Working oil having flowed in the front cover 3 and the pump shell 40 is returned to the hydraulic control device via an oil passage formed between a sleeve portion of the pump shell 40 and a stator shaft etc.

Figure 3:
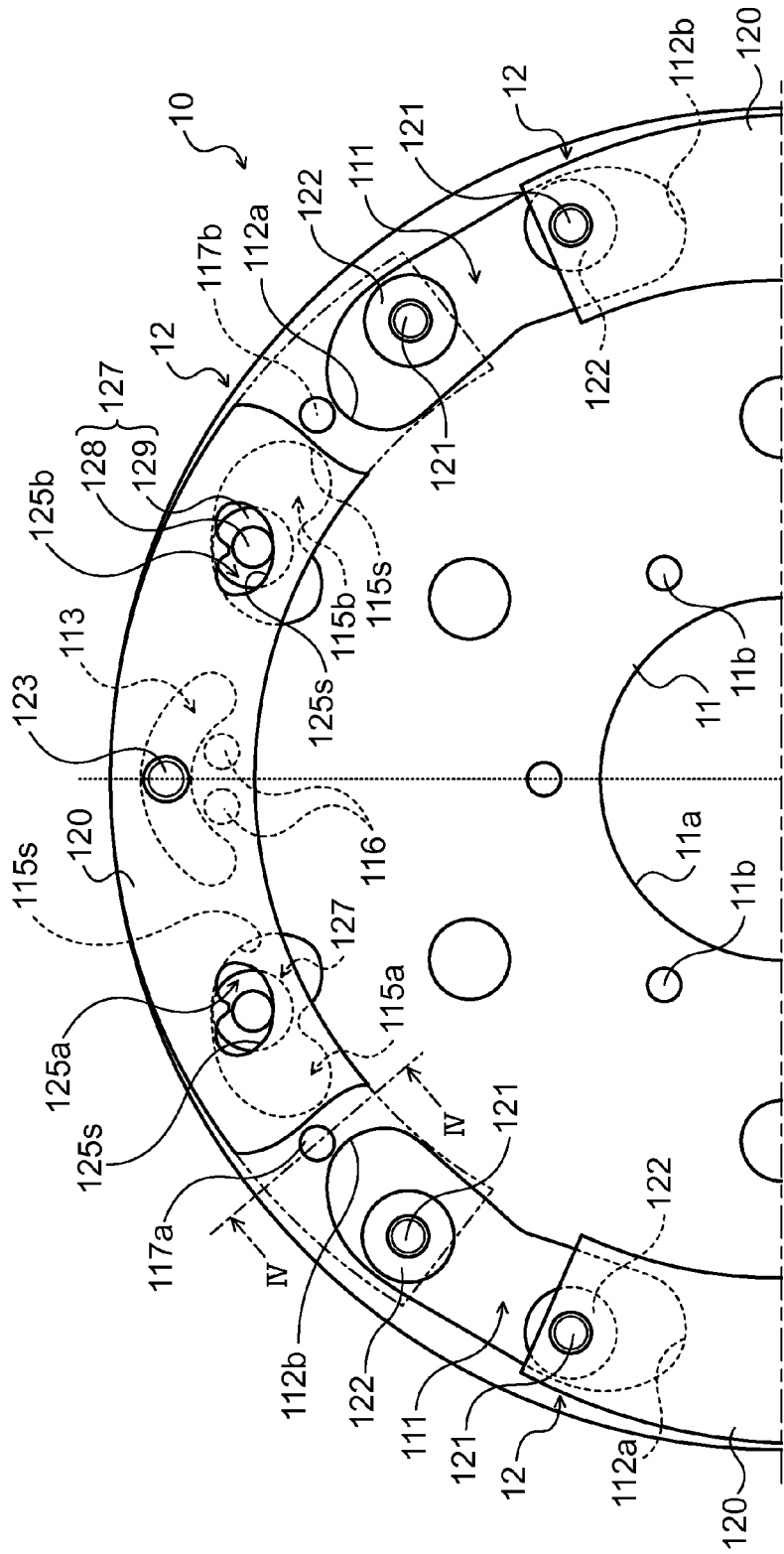
FIG. 3 is a front view illustrating a centrifugal-pendulum vibration absorbing device included in the starting device of FIG. 1.

The centrifugal-pendulum vibration absorbing device 10 is disposed in the clutch engagement chamber 99 so as to be positioned between the lock-up piston 90 and the damper mechanism 8. As illustrated in FIG. 1, the centrifugal-pendulum vibration absorbing device 10 is surrounded by the lock-up piston 90 and the drive member 80 from the front cover 3 side (engine side) and the radially outer side. As illustrated in FIGS. 1 and 3, the centrifugal-pendulum vibration absorbing device 10 includes a support member (flange) 11 coaxially attached to the intermediate member 83 serving as a rotary element of the damper mechanism 8 and extends in parallel with a clutch engagement chamber 99 side-surface of the lock-up piston 90, and a plurality of (in the embodiment, three) mass bodies 12 that are swingably supported by the support member 11 and that are adjacent to each other in the circumferential direction. The centrifugal-pendulum vibration absorbing device 10 absorbs (damps) vibration between the front cover 3 and the damper hub 7 with the plurality of mass bodies 12 swung in the same direction with respect to the support member 11 along with rotation of the support member 11 to apply to the intermediate member 83 of the damper mechanism 8 vibration that is opposite in phase to vibration of the intermediate member 83.

The support member 11 is formed in a generally annular shape by pressing a metal plate, for example, and has a fitting hole 11a which is formed in the center portion of the support member 11 and in which the damper hub 7 is rotatably fitted, for example. The support member 11 is fixed to the intermediate member 83 of the damper mechanism 8 via a plurality of coupling holes 11b formed around the fitting hole 11a and a fastening member such as a rivet (not illustrated). This enables the support member 11 to be disposed coaxially with and rotate together with the intermediate member 83. It should be noted, however, that the support member 11 may be coupled to the drive member (input element) 80 or the driven member (output element) 84 of the damper mechanism 8.

Each mass body 12 includes two weights 120 that face each other in the axial direction of the starting device 1 and that are coupled to each other, two rivets 121 and one rivet 123 serving as coupling members that couple the two weights 120 to each other, two guide opening portions (weight-side notch portions) 125a and 125b formed in each weight 120, and two guide rollers 127. As illustrated in FIG. 3, each weight 120 is a metal plate curved in a generally arcuate shape so as to extend along the outer periphery of the support member 11 as seen from the axial direction of the support member 11, and has a symmetrical shape. The rivets 121 couple the two weights 120 to each other on both sides of the two guide rollers 127, that is, at both the left and right end portions of the mass body 12. The rivets 121 each rotatably support a stopper roller 122 composed of an elastic element such as a rubber material. In addition, the rivet 123 couples the two weights to each other at a location between the two guide rollers 127, that is, at the center portion in the width direction of the mass body 12.

In the embodiment, as illustrated in FIG. 3, the guide opening portion 125a and the guide opening portion 125b are formed as long holes that are asymmetrical and that each have a curve that is convex toward the center of the support member 11 (pendulum fulcrum) as the axis of the hole, and shaped to be a mirror image of each other. One guide opening portion 125a and one guide opening portion 125b are provided for each of the weights 120, spaced from each other, and disposed symmetrically about a swing center line of the mass body 12 (a line connecting between the pendulum fulcrum (the axis of the starting device 1 and the centrifugal-pendulum vibration absorbing device 10) and the point of application; see the dotted line in FIG. 3). It should be noted, however, that the guide opening portions 125a, 125b may be formed as long holes that are symmetrical. The guide rollers 127 are each formed by integrating a small-diameter roller 128 and a large-diameter roller 129 with each other. The small-diameter roller 128 projects on both sides of the large-diameter roller 129 in the axial direction, and rollably inserted into the guide opening portions 125a or 125b of the two weights 120 to be rollably supported by the mass body 12, that is, the two weights 120. In the embodiment, the small-diameter roller 128 of each guide roller 127 basically rolls on an inner peripheral surface 125s on the radially inner side of the corresponding guide opening portion 125a or 125b.

In addition, the support member 11 has a plurality of (in the embodiment, three) stopper opening portions (second notch portions) 111 that permit movement of the rivets 121 and the stopper rollers 122 discussed above and that abut against the stopper rollers 122 to determine the swing range of the mass body 12, and an opening portion 113 provided at the center portion of the mass body 12 in the width direction to permit movement of the rivet 123 which couples the two weights 120 to each other. Further, the support member 11 has a plurality of (in the embodiment, three each) guide opening portions (first notch portions) 115a, 115b that guide the guide rollers 127 together with the guide opening portions 125a, 125b on the mass body 12 side such that the mass body 12 moves along a track determined in advance. As illustrated in FIG. 3, the guide opening portions 115a, 115b of the support member 11 have a larger opening area than the respective guide opening portions 125a, 125b of the mass body 12.

As illustrated in FIG. 3, the stopper opening portions 111 are formed at equal intervals in the support member 11 such that two stopper opening portions 111 are provided for each of the mass bodies 12 to be positioned on both sides of two guide opening portions 115a, 115b provided for the mass body 12, that is, such that each stopper opening portion 111 is positioned between adjacent mass bodies 12. In addition, each stopper opening portion 111 has a stopper surface 112a corresponding to the stopper roller 122 of one of the two adjacent mass bodies 12, and a stopper surface 112b corresponding to the stopper roller 122 of the other of the two adjacent mass bodies 12. In the embodiment, the inner peripheral surface of the stopper opening portion 111 is formed such that the stopper rollers 122 basically abut against only the stopper surfaces 112a and 112b during reciprocal movement in the stopper opening portion 111.

Consequently, when the mass body 12 is swung with respect to the support member 11 to be shaken to one side, both the two stopper rollers 122 of each mass body 12 abut against the stopper surfaces 112a or 112b of the stopper opening portions 111 at the same time, whereby the swing range of the mass body 12 is determined. In addition, the burden on the stopper rollers 122 can be reduced to improve the durability compared to a case where only one of the two stopper rollers 122 abuts against the stopper surface 112a or 112b when the mass body 12 is shaken to one side in this way.

In the embodiment, the guide opening portion 115a and the guide opening portion 115b are formed as long holes that are asymmetrical and that each have a curve that is convex toward the radially outer side of the support member 11 as the axis of the hole, and shaped to be a mirror image of each other. One guide opening portion 115a and one guide opening portion 115b are provided for each of the mass bodies 12, spaced from each other, and disposed symmetrically about a swing center line of the mass body 12. It should be noted, however, that the guide opening portions 115a, 115b may also be formed as long holes that are symmetrical. The large-diameter rollers 129 of the guide rollers 127 rollably supported by each of the mass bodies 12 are rollably disposed in the guide opening portion 115a and the guide opening portion 115b provided for the mass body 12, whereby the mass body 12 is swingably supported by the support member 11. In the embodiment, the large-diameter roller 129 of each guide roller 127 basically rolls on an inner peripheral surface 115s on the radially outer side of the corresponding guide opening portion 115a or 115b.

In the thus configured centrifugal-pendulum vibration absorbing device 10, when the support member 11 rotates along with rotation of the intermediate member 83 of the damper mechanism 8, the small-diameter roller 128 of each guide roller 127 rolls on the inner peripheral surface 125s of the guide opening portion 125a or 125b of the corresponding mass body 12, and the large-diameter roller 129 of each guide roller 127 rolls on the inner peripheral surface 115s of the guide opening portion 115a or 115b of the support member. Consequently, each mass body 12 is swung with respect to the support member 11 along a track determined in advance along with rotation of the support member 11 with the guide rollers 127 guided by both the guide opening portions 125a, 125b of the mass body 12 and the guide opening portions 115a, 115b of the support member 11.

In the centrifugal-pendulum vibration absorbing device 10 according to the embodiment, as discussed above, the guide opening portion 125a and the guide opening portion 125b of each of the mass bodies 12 are formed as long holes that are asymmetrical (or symmetrical) and that each have a curve that is convex toward the center of the support member 11 as the axis of the hole, and disposed symmetrically about the swing center line of the mass body 12. In contrast, the guide opening portion 115a and the guide opening portion 115b of the support member 11 provided for each of the mass bodies 12 are formed as long holes that are asymmetrical (or symmetrical) and that each have a curve that is convex toward the radially outer side of the support member 11 as the axis of the hole, and disposed symmetrically about the swing center line of the mass body 12. Consequently, in the centrifugal-pendulum vibration absorbing device 10, each mass body 12 can be turned about the pendulum fulcrum along with rotation of the support member 11, and rotated about the center of gravity as the mass body 12 is shaken to one side within the swing range. In this way, with the mass bodies 12 supported by the support member 11 so as to be turnable about the pendulum fulcrum and rotatable about the center of gravity, it is possible to damp vibration transferred to the support member 11 by utilizing not only swing motion of the mass bodies 12 about the pendulum fulcrum but also the moment of rotation of the mass bodies 12 about the center of gravity.

In the embodiment, in addition, the stopper rollers 122 of each mass body 12 and the stopper surfaces 112a, 112b of the stopper opening portions 111 and the guide opening portions 115a, 115b of the support member 11 are configured such that the stopper roller 122 abuts against the stopper surface 112a, 112b before the guide roller 127 (the small-diameter roller 128 and the large-diameter roller 129) bumps into (collides against) the inner peripheral surface 125s, 115s of the guide opening portion 125a, 125b or the guide opening portion 115a, 115b when the mass body 12 is swung to be shaken to one side. That is, in the centrifugal-pendulum vibration absorbing device 10, the guide roller 127 can bump into the inner peripheral surface 125s, 115s of the guide opening portion 125a, 125b or the guide opening portion 115a, 115b after the stopper roller 122 abuts against the stopper surface 112a or 112b. This makes it possible to suppress abnormal sound generated when the guide roller 127 bumps into (collides against) the inner peripheral surface 125s, 115s, to prevent the stopper roller 122 from being strongly pushed against the stopper surface 112a, 112b, and to improve the durability of the stopper roller 122.

Further, in the centrifugal-pendulum vibration absorbing device 10 according to the embodiment, as illustrated in FIG. 3, the opening portions 113 of the support member 11 are long holes that are generally arcuate and symmetrical and that each have a curve that is convex toward the radially outer side of the support member 11 as the axis the hole. The support member 11 is formed with two protrusions 116 positioned on the radially inner side of each opening portion 113. The protrusions 116 determine a gap (minimum gap) between the support member 11 and the two weights 120. The two protrusions 116 are formed on the support member 11 by pressing, for example. One of the protrusions 116 projects toward one of the two weights 120, and the other protrusion 116 projects toward the other of the two weights 120.

Figure 4:
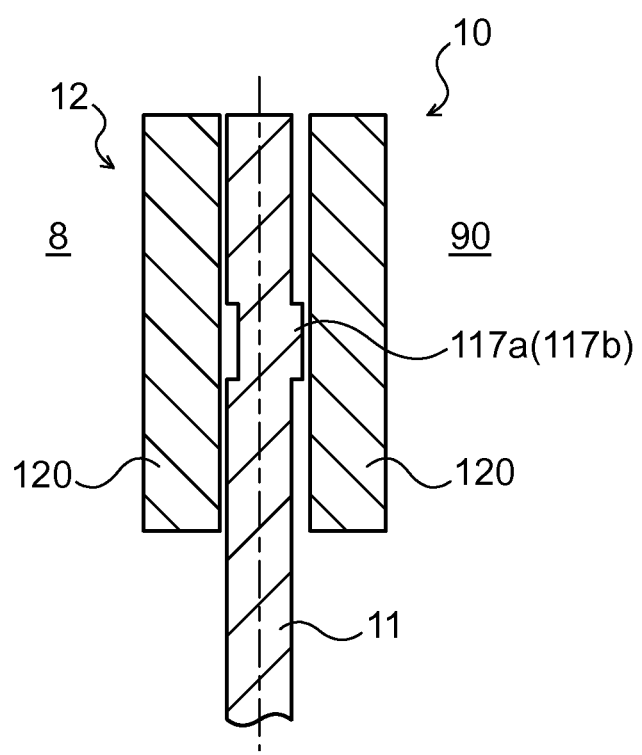
FIG. 4 is an enlarged sectional view taken along the line IV-IV in FIG. 3.

In addition, the support member 11 is formed with a weight support protrusion 117a that projects in the axial direction of the support member 11 (centrifugal-pendulum vibration absorbing device 10) from a location between the stopper opening portion 111 and the guide opening portion 115a which are adjacent to each other, and a weight support protrusion 117b that projects in the axial direction of the support member 11 (centrifugal-pendulum vibration absorbing device 10) from a location between the stopper opening portion 111 and the guide opening portion 115b which are adjacent to each other. The weight support protrusions 117a, 117b are each formed on the support member 11 by pressing, for example, in closer proximity to the stopper opening portion 111 than the guide opening portion 115a or 115b. As illustrated in FIGS. 3 and 4, the weight support protrusions 117a, 117b each project in the axial direction of the input shaft 20 toward the weight 120 disposed on the lock-up piston 90 side at a location on the circumferential end portion side of the mass body 12 with respect to the guide opening portion 115a, 115b. The amount of projection of the weight support protrusions 117a and 117b from the surface of the support member 11 is determined to be about the same as the amount of projection of the protrusions 116.

In addition, in the embodiment, as illustrated in FIG. 4, the weight support protrusions 117a and 117b are formed on the support member 11 so as to face only one of the two weights 120 of the mass body 12, that is, one of the weights 120 that is disposed not on the damper mechanism 8 side but on the lock-up piston 90 side. That is, the support member 11 and the weight 120 disposed on the damper mechanism 8 side do not have another protrusion that projects in the axial direction at a position that is symmetrical with respect to the weight support protrusions 117a, 117b about a plane (see the dash-and-dot line in FIG. 4) that is orthogonal to the axis of the input shaft 20 and that passes through the center, in the thickness direction, of a portion of the support member 11 interposed between the two weights 120. Consequently, the support member 11 and the mass bodies 12 (weights 120) of the centrifugal-pendulum vibration absorbing device 10 can be formed easily, and the configuration of each member can be simplified.

Next, operation of the starting device 1 configured as described above will be described.

When lock-up is established by the lock-up clutch mechanism 9 of the starting device 1, power from the engine serving as a motor is transferred to the input shaft 20 of the speed change device via the front cover 3, the lock-up clutch mechanism 9, the drive member 80, the first coil springs 81, the intermediate member 83, the second coil springs 82, the driven member 84, and the damper hub 7. In this event, variations in torque input to the front cover 3 are mainly absorbed by the first and second coil springs 81 and 82 of the damper mechanism 8.

In the starting device 1 according to the embodiment, further, when the damper mechanism 8 connected to the front cover 3 by the lock-up piston along with lock-up is rotated together with the front cover 3, the support member 11 coupled to the intermediate member 83 of the damper mechanism 8 is also rotated together with the intermediate member 83 about the axis of the starting device 1. Thus, along with rotation of the support member 11, the plurality of mass bodies 12 constituting the centrifugal-pendulum vibration absorbing device 10 are swung in the same direction with respect to the support member 11 while being guided by the guide opening portions 115*a*, 115*b*, 125*a*, 125*b* via the guide rollers 127. Consequently, vibration that is opposite in phase to vibration (resonance) of the intermediate member 83 is applied from the centrifugal-pendulum vibration absorbing device 10 to the intermediate member 83, which also enables the centrifugal-pendulum vibration absorbing device 10 to absorb (damp) vibration between the front cover 3 and the damper hub 7. In the starting device 1 according to the embodiment, in addition, the turbine runner 5 is connected to the intermediate member 83 (first and second intermediate plates 831, 832) of the damper mechanism 8, which tends to vibrate between the first and second coil springs 81 and 82, and thus the turbine runner 5 functions as a so-called turbine damper. This enables both the turbine damper constituted by the turbine runner 5 and the centrifugal-pendulum vibration absorbing device 10 to favorably absorb vibration of the intermediate member 83, and hence vibration of the entire damper mechanism 8, during lock-up.

As a result, with the starting device 1, it is possible to establish lock-up when the rotational speed of the engine coupled to the front cover 3 reaches a lock-up rotational speed Nlup which is significantly low, for example about 1000 rpm, and to improve the efficiency of power transfer between the engine and the speed change device to further improve the fuel efficiency of the engine by establishing lock-up when the rotational speed of the engine reaches the lock-up rotational speed Nlup which is significantly low.

When lock-up is released (the lock-up clutch mechanism 9 is disengaged) in the starting device 1 so that the front cover 3 and the drive member 80 are not coupled each other by the lock-up clutch mechanism 9, on the other hand, power from the engine serving as a motor is transferred to the input shaft 20 of the speed change device via the front cover 3, the pump impeller 4, the turbine runner 5, the intermediate member 83 of the damper mechanism 8, the second coil springs 82, the driven member 84, and the damper hub 7.

Here, lock-up by the lock-up clutch mechanism 9, that is, coupling between the front cover 3 and the drive member of the damper mechanism 8, that is, the input shaft 20, is released by increasing the clutch disengagement pressure supplied to the lock-up chamber 95 to be higher than the clutch engagement pressure supplied to the clutch engagement chamber 99 to move the lock-up piston 90 away from the front cover 3. When lock-up is released, however, working oil supplied into the lock-up chamber 95 between the front cover 3 and the lock-up piston 90 flows out to the outer peripheral side via a gap between the front cover 3 and the friction material 91. In the starting device 1 according to the embodiment, the plurality of gaps (openings) G for communication between the inside and the outside are formed at the coupling portion between the lock-up piston 90 and the drive member 80 of the damper mechanism 8. Thus, working oil flowing out of the lock-up chamber 95 flows from the plurality of gaps G into the clutch engagement chamber 99 defined by the lock-up piston 90 and the drive member 80, that is, into a space around the centrifugal-pendulum vibration absorbing device 10. Working oil flowing into the clutch engagement chamber 99 in this way flows out toward the torus mainly through the first coil springs 81 of the damper mechanism 8 disposed on the turbine runner 5 side with respect to the centrifugal-pendulum vibration absorbing device 10 and the plurality of gaps G. In the starting device 1, in addition, a pressure on the side of the turbine runner 5 and the pump impeller 4 with respect to the damper mechanism 8 is reduced by rotation of the turbine runner 5 etc. Consequently, while lock-up is released, a flow of working oil directed from the lock-up piston 90 side toward the damper mechanism 8 is produced in the clutch engagement chamber 99, and a thrust force in the axial direction directed from the lock-up piston 90 side toward the damper mechanism 8, that is, in a generally constant direction, is applied to the weights 120, of the mass bodies 12 of the centrifugal-pendulum vibration absorbing device 10, disposed on the lock-up piston 90 side.

As a result, in the starting device 1 according to the embodiment, when lock-up by the lock-up clutch mechanism 9 is released, each mass body 12 of the centrifugal-pendulum vibration absorbing device 10, that is, one of the two weights 120 constituting each mass body 12 on the lock-up piston 90 side, is pressed by a thrust force in the axial direction directed from the lock-up piston 90 side toward the damper mechanism 8, and pushed against the support member 11. In this event, if no measures are taken, the thrust force may move or warp the weight 120 on the lock-up piston 90 side to tilt (the axis of) the rivet 121 which couples the two weights 120 to each other.

If such a tilt of the rivet 121 is caused, the stopper roller 122 serving as a cushioning member supported by the rivet 121 may bump into the stopper surface 112*a* or 112*b* of the stopper opening portion 111 on one side when the support member 11 is rotated together with the intermediate member 83 of the damper mechanism 8 connected to the turbine runner with lock-up released and the mass body 12 is swung along with such rotation to be shaken to one side. In addition, the two respective stopper rollers 122 of each mass body 12 may not abut against the stopper surfaces 112*a*, 112*b* at the same time. Further, the stopper rollers 122 each may not abut against the stopper surface 112*a* or 112*b* before the guide roller 127 (the small-diameter roller 128 and the large-diameter roller 129) bumps into (collides against) the inner peripheral surface 125*s*, 115*s* of the guide opening portion 125*a*, 125*b* or the guide opening portion 115*a*, 115*b* when the mass body 12 is swung to be shaken to one side. As a result, the durability of the stopper roller 122 serving as a cushioning member may be impaired by the stopper roller 122 bumping into the stopper surface 112*a*, 112*b* on one side, and the function of the stopper roller 122 to mitigate a collision between the guide roller 127 and the inner peripheral surface 125*s*, 115*s*, that is, abnormal sound, may be impaired.

It should be noted, however, that when lock-up by the lock-up clutch mechanism 9 is released, the direction of a flow of working oil produced around the centrifugal-pendulum vibration absorbing device in the clutch engagement chamber 99 is maintained in the direction from the lock-up piston side toward the damper mechanism, that is, kept generally constant, and is not reversed. While a relatively large thrust force in the axial direction of the centrifugal-pendulum vibration absorbing device 10 is applied to one of the two weights 120 constituting the mass body 12 on the lock-up piston 90 side, such a large thrust force is not applied to the other weight 120 on the damper mechanism 8 side. Thus, it is possible to press the weight 120 on the lock-up piston 90 side toward the support member 11 using the thrust force and keep the weight support protrusions 117*a*, 117*b* in abutment with the weight 120 by forming the plurality of gaps G at the coupling portion between the lock-up piston 90 and the drive member 80 to cause working oil from the lock-up chamber 95 to actively flow into the clutch engagement chamber 99 when lock-up is released, and providing the support member 11 with the weight support protrusions 117*a*, 117*b* which project in the axial direction of the input shaft 20 toward the weight 120 disposed on the lock-up piston 90 side. Consequently, it is possible to favorably suppress a tilt of each mass body 12 relative to the axis of the support member 11 (input shaft 20) and a shake of each mass body 12 relative to the support member 11 when the support member 11 rotates at a significantly low rotational speed while lock-up is released. Examples of the timing when the rotational speed of the support member 11 is significantly low include when the vehicle starts to travel, when the vehicle becomes stationary along with a brake operation (since immediately before the vehicle becomes stationary until the vehicle is stationary), and when the shift range is changed from a drive range to a neutral range with a brake pedal depressed to make the input shaft 20 free.

In the embodiment, in addition, the support member 11 of the centrifugal-pendulum vibration absorbing device 10 is formed with the weight support protrusion 117a which projects in the axial direction of the support member 11 from a location between the stopper opening portion 111 and the guide opening portion 115a which are adjacent to each other, and the weight support protrusion 117b which projects in the axial direction of the support member 11 from a location between the stopper opening portion 111 and the guide opening portion 115b which are adjacent to each other. Consequently, the weight 120 on the lock-up piston 90 side can be supported by the weight support protrusions 117a, 117b projecting from a location between the stopper opening portion 111 and the guide opening portion 115a or 115b even if the thrust force in the axial direction of the centrifugal-pendulum vibration absorbing device 10 discussed above is applied to each mass body 12 and the weight 120 on the lock-up piston 90 side is pushed against the support member 11.

As a result, it is possible to prevent the stopper roller 122 serving as a cushioning member and supported by the rivet 121 from bumping into the stopper surface 112a or 112b of the stopper opening portion 111 on one side because of movement (elastic deformation) of the weight 120 on the lock-up piston 90 side, and to favorably maintain the durability and the function of the stopper roller 122 to mitigate a collision between the guide roller 127 and the inner peripheral surface 125s, 115s, that is, abnormal sound. In the embodiment, in addition, the weight 120 does not have a notch portion (opening portion) around the rivets 121. Thus, with the weight support protrusions 117a, 117b projecting toward the weight 120 from the support member 11 that has the stopper opening portions 111 and the guide opening portions 115a, 115b, the weight 120 pushed against the support member 11 can be favorably supported by the weight support protrusions 117a, 117b.

In the starting device 1, as described above, when lock-up by the lock-up clutch mechanism 9 is released, a flow of working oil directed from the lock-up piston 90 side toward the damper mechanism 8 is produced in the clutch engagement chamber 99, and a thrust force in the axial direction directed from the lock-up piston 90 side toward the damper mechanism 8 is applied to the weight 120, of the mass body 12 of the centrifugal-pendulum vibration absorbing device 10, disposed on the lock-up piston 90 side. The support member 11 of the centrifugal-pendulum vibration absorbing device 10 is provided with the weight support protrusions 117a, 117b which project in the axial direction of the input shaft 20 toward the weight 120 disposed on the lock-up piston 90 side. Consequently, it is possible to press the weight 120 on the lock-up piston 90 side toward the support member 11 using the thrust force and keep the weight support protrusions 117a, 117b in abutment with the weight 120, and to suppress a tilt of each mass body 12 relative to the axis of the support member 11 and a shake of each mass body 12 relative to the support member 11 when the support member 11 rotates at a significantly low rotational speed while lock-up is released. Further, the support member 11 and the weight 120 disposed on the damper mechanism 8 side do not have another protrusion that projects in the axial direction at a position that is symmetrical with respect to the weight support protrusions 117a, 117b about a plane (see the dash-and-dot line in FIG. 4) that is orthogonal to the axis of the input shaft 20 and that passes through the center, in the thickness direction, of a portion of the support member 11 interposed between the two weights 120. Consequently, the support member 11 and the mass bodies 12 of the centrifugal-pendulum vibration absorbing device 10 can be formed easily, and the configuration of each member can be simplified. As a result, with the starting device 1, behavior of the mass bodies 12 that occurs when the support member 11 of the centrifugal-pendulum vibration absorbing device 10 rotates at a significantly low rotational speed can be stabilized with a simple configuration.

In addition, if the support member 11 is provided with the weight support protrusions 117a, 117b which project toward the weight 120 disposed on the lock-up piston 90 side as in the embodiment, the weight support protrusions 117a, 117b can be formed easily compared to a case where protrusions similar to the weight support protrusions 117a, 117b are formed on the weight 120. In the embodiment, further, the guide opening portions 115a, 115b of the support member 11 have a larger opening area than the respective guide opening portions 125a, 125b of the mass body 12 (weight 120), and the weight support protrusions 117a, 117b each are formed to project toward the weight 120 disposed on the lock-up piston 90 side at a location on the circumferential end portion side of the mass body 12 with respect to the guide opening portion 115a, 115b. Consequently, the weight support protrusions 117a, 117b can be favorably prevented from falling into the guide opening portions 125a, 125b of the weight 120, and smooth swing of the mass body 12 can be secured.

It is a matter of course, however, that protrusions that project in the axial direction of the input shaft 20 toward the support member 11 may be formed on a surface of the weight 120 disposed on the lock-up piston 90 side, which faces the support member 11. In this case, the protrusions of the weight 120 are preferably disposed away from the guide opening portions 115a, 115b of the support member 11 such that the protrusions do not fall into the guide opening portions 115a, 115b.

In the centrifugal-pendulum vibration absorbing device 10 of the starting device 1, in addition, the mass bodies 12 each include the rivets (coupling members) 121 which couple the two weights 120 to each other and which have the stopper rollers 122 serving as a cushioning member. The support member 11 includes the stopper opening portions (second notch portions) 111 each of which permits movement of the rivets 121 and the stopper rollers 122 and each of which abuts against the stopper rollers 122 of the rivets 121 to determine the swing range of the mass body 12. The weight support protrusions 117a, 117b each project toward the weight 120 from a location between the stopper opening portion 111 and the guide opening portion 115a or 115b. Each mass body 12 moves along a track determined in advance with the guide rollers 127 guided by the guide opening portions 115a, 115b of the support member 11 and the guide opening portions 125a, 125b of the mass body 12.

The swing range of each mass body 12 is determined with the stopper opening portions 111 and the stopper rollers 122 of the rivets 121 in abutment with each other.

Consequently, in the centrifugal-pendulum vibration absorbing device 10, the stopper opening portions 111 and the stopper rollers 122 of the rivets 121 abut against each other to mitigate a collision of the guide rollers 127 against the support member 11, that is, the guide opening portions 115a, 115b, thereby suppressing generation of abnormal sound along with swing of the mass bodies 12. In the starting device 1, further, each of the weights 120 on the lock-up piston 90 side can be supported by the weight support protrusions 117a, 117b each projecting from a location between the stopper opening portion 111 and the guide opening portion 115a or 115b even if the thrust force in the axial direction of the centrifugal-pendulum vibration absorbing device 10 discussed above is applied to each mass body 12 and the weight 120 is pushed against the support member 11. As a result, it is possible to prevent the stopper roller 122 of the rivet 121 from bumping into the stopper surface 112a or 112b of the stopper opening portion 111 on one side because of movement (deformation) of the weight 120 on the lock-up piston 90 side, and to favorably maintain the function of the stopper roller 122 to mitigate the collision described above, that is, abnormal sound. Further, the weight 120 does not have a notch portion (opening portion) around the rivets 121. Thus, with the weight support protrusions 117a, 117b projecting toward the weight 120 from the support member 11 having the stopper opening portions 111 and the guide opening portions 115a, 115b, the weight 120 pushed against the support member 11 can be favorably supported by the weight support protrusions 117a, 117b. Thus, with the centrifugal-pendulum vibration absorbing device 10, it is possible to favorably suppress generation of abnormal sound along with swing of the mass body 12 while an adequate gap is kept between the two weights 120 constituting the mass body 12 and the support member 11.

In the embodiment, in addition, the weight support protrusions 117a, 117b are disposed in closer proximity to the respective stopper opening portions 111 than the respective guide opening portions 115a, 115b. Consequently, movement (deformation) in the axial direction of the weight 120 around the rivets 121 can be favorably suppressed when a thrust force in the axial direction of the centrifugal-pendulum vibration absorbing device 10 is applied to each mass body 12. Thus, it is possible to favorably prevent the stopper roller 122 from bumping into the stopper surface 112a, 112b of the stopper opening portion 111 on one side because of movement (deformation) of the weight 120.

Figure 5:
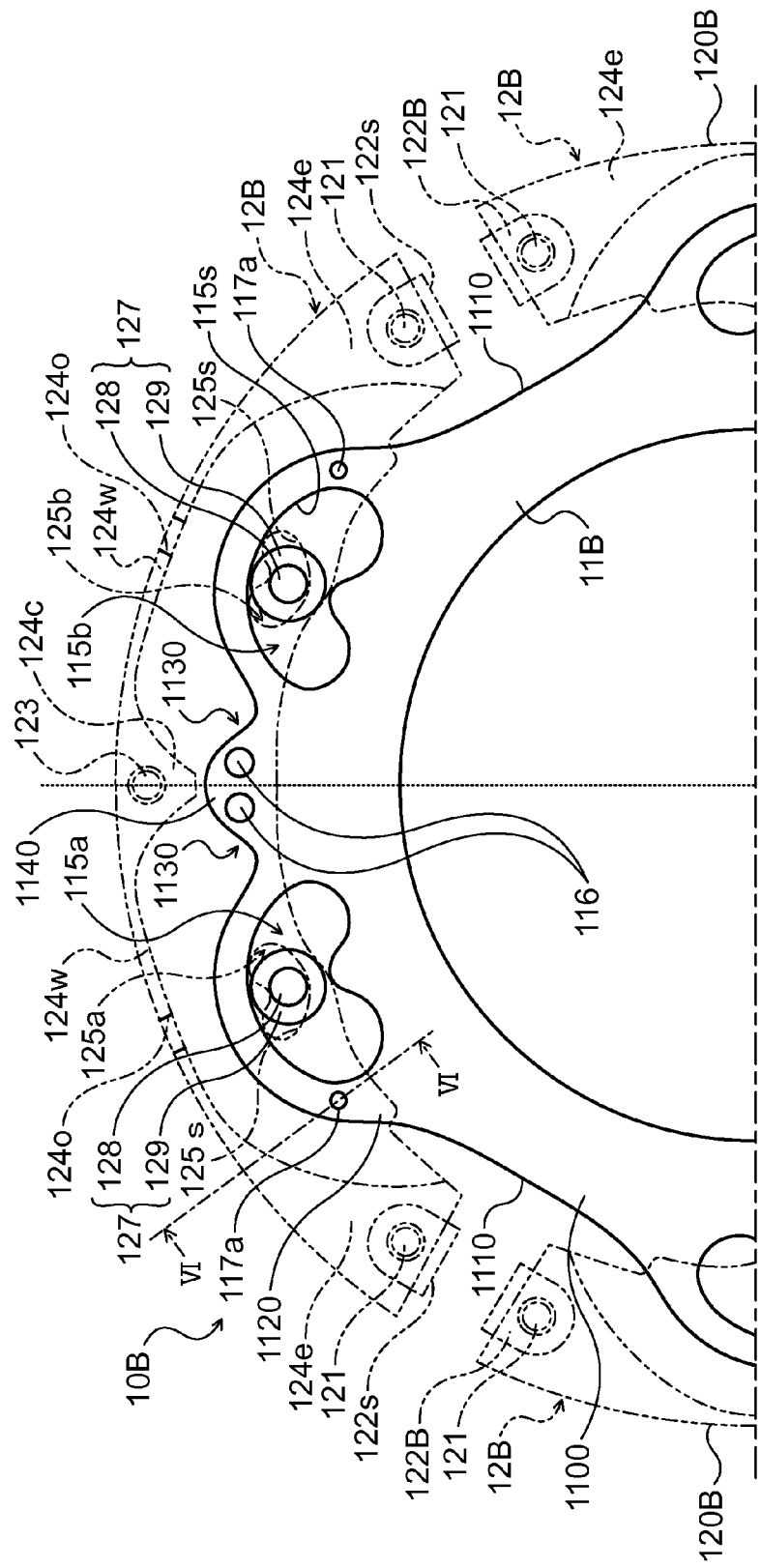
FIG. 5 is a front view illustrating another centrifugal-pendulum vibration absorbing device that may be applied to the starting device of FIG. 1.

FIG. 5 illustrates another centrifugal-pendulum vibration absorbing device 10B that may be applied to the starting device 1 discussed above in place of the centrifugal-pendulum vibration absorbing device 10. Constituent elements of the centrifugal-pendulum vibration absorbing device 10B that are identical to the elements of the centrifugal-pendulum vibration absorbing device 10 discussed above are given the same numerals to omit redundant descriptions. In the centrifugal-pendulum vibration absorbing device 10B illustrated in the drawing, two rivets 121 serving as coupling members couple two weights 120B to each other on both sides of the two guide rollers 127, that is, at both the left and right end portions of a mass body 12B. The rivets 121 each support a stopper 122B serving as a cushioning member. The stopper 122B is formed from an elastic element such as a rubber material, and has a flat abutment surface 122s. In the centrifugal-pendulum vibration absorbing device 10B, the stoppers 122B of adjacent mass bodies 12B, that is, the flat abutment surfaces 122s of adjacent stoppers 122B, abut against each other to determine the swing range of the mass bodies 12B. In addition, the rivet 123 couples the two weights 120B to each other between the two guide rollers 127, that is, at the center portion in the width direction of the mass body 12B.

In addition, the stoppers 122B of each mass body 12B are configured such that the abutment surfaces 122s of adjacent stoppers 122B abut against each other before the guide roller 127 (the small-diameter roller 128 and the large-diameter roller 129) bumps into the inner peripheral surface 125s, 115s of the guide opening portion 125a, 125b or the guide opening portion 115a, 115b when the mass body 12B is swung to be shaken to one side. That is, in the centrifugal-pendulum vibration absorbing device 10B, the guide roller 127 can bump into the inner peripheral surface 125s, 115s of the guide opening portion 125a, 125b or the guide opening portion 115a, 115b after the abutment surfaces 122s of adjacent stoppers 122B abut against each other. Consequently, it is possible to suppress abnormal sound generated when the guide roller 127 bump into the inner peripheral surface 125s, 115s. By forming the abutment surfaces 122s of the stoppers 122B to be flat, it is possible to increase the area of contact between the stoppers 122B to favorably absorb the impact of a collision between the stoppers 122B when such a collision occurs, and to reduce the burden on each stopper 122B to improve the durability.

Further, in the centrifugal-pendulum vibration absorbing device 10B, in order to improve the vibration damping effect by increasing the weight of each mass body 12B while making each mass body 12B compact, recessed portions (removed portions) 1110 that are depressed toward the center of a support member 11B are formed in the support member 11B at equal intervals on both sides of the two guide opening portions 115a, 115b so as to interpose the guide opening portions 115a, 115b, that is, so as to be positioned between adjacent mass bodies 12B (such that two recessed portions 1110 are provided for each of the mass bodies 12B). In addition, the support member 11B includes, for each mass body 12, two (a total of six) intermediate recessed portions 1130 provided between the two guide opening portions 115a, 115b for each of the mass bodies 12B and depressed toward the center of the support member 11B, and a projecting portion (a total of three projecting portions) 1140 that projects radially outward from a location between the two intermediate recessed portions 1130. Each projecting portion 1140 projects radially outward so as to separate the two intermediate recessed portions 1130 provided between the two guide opening portions 115a, 115b for each of the mass bodies 12B and depressed toward the center of the support member 11B. Each projecting portion 1140 is formed with two protrusions 116 that determine a gap (minimum gap) between the support member 11B and the two weights 120.

Figure 6:
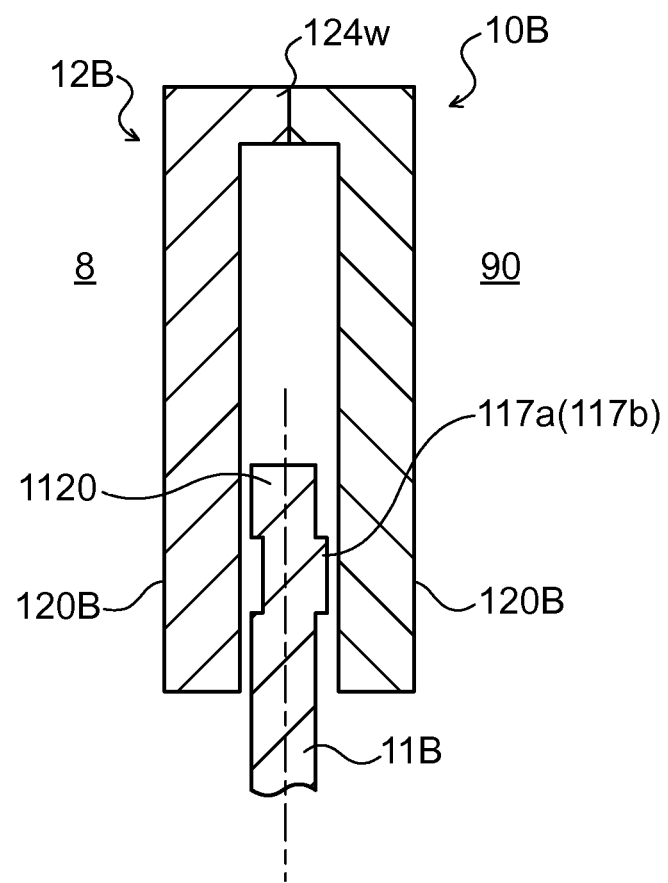
FIG. 6 is an enlarged sectional view taken along the line VI-VI in FIG. 5.

In addition, the support member 11B of the centrifugal-pendulum vibration absorbing device 10B has a small-diameter portion 1100, on the outer periphery of which the plurality of recessed portions 1110 are formed, and a number of large-diameter portions 1120 that swell radially outward from the small-diameter portion 1100, the number of the large-diameter portions 1120 being the same as that of the mass bodies 12B. Each large-diameter portion 1120 is formed with the intermediate recessed portions 1130, the projecting portion 1140, and the guide opening portions 115a, 115b for each of the mass bodies 12B. Further, as illustrated in FIGS. 5 and 6, the large-diameter portions 1120 of the support member 11B are each formed with the weight support protrusions 117a, 117b which project toward the weight 120B disposed on the lock-up piston 90 side. As illustrated in FIG. 5, the weight support protrusions 117a, 117b project in the axial direction of the input shaft 20 toward the weight 120B disposed on the lock-up piston 90 side from a location on the circumferential end portion side of the mass body 12B with respect to the guide opening portion 115a, 115b, that is, from a location between the guide opening portion 115a, 115b and the recessed portion 1110. In the centrifugal-pendulum vibration absorbing device 10B as well, as illustrated in FIG. 6, the support member 11B and the weight 120B disposed on the damper mechanism 8 side do not have another protrusion that projects in the axial direction at a position that is symmetrical with respect to the weight support protrusions 117a, 117b about a plane (see the dash-and-dot line in FIG. 6) that is orthogonal to the axis of the input shaft 20 and that passes through the center, in the thickness direction, of a portion of the support member 11B interposed between the two weights 120B.

Further, each mass body 12B of the centrifugal-pendulum vibration absorbing device 10B has two additional weight portions 124e provided on both sides of the two guide rollers 127 so as to be positioned on the radially outer side of the recessed portions 1110 of the support member 11B. Each additional weight portion 124e is formed to be as large as possible within such a range that a space for arrangement of the stopper 122B is secured without the additional weight portion 124e contacting the corresponding recessed portion 1110. In addition, each mass body 12B has a plurality of (for example, three) center additional weight portions 124c positioned on the radially outer side of the two intermediate recessed portions 1130 and the projecting portion 1140. Each center additional weight portion 124c is formed around the rivet 123 to be as large as possible in such a range that the center additional weight portion 124c does not contact the corresponding intermediate recessed portions 1130 or projecting portion 1140. In addition, each mass body 12B has a thin wall-like additional weight portion 124w provided between the additional weight portions 124e positioned at both the left and right end portions and the center additional weight portion 124c positioned at the center portion in the width direction to extend along the outer periphery of the mass body 12B (weights 120B) such that the additional weight portions 124e and the center additional weight portion 124c are continuous with each other. Further, as illustrated in FIGS. 5 and 6, openings 124o are formed in the wall-like additional weight portions 124w, that is, the outer peripheral portion of the mass body 12B.

As seen from FIG. 6, the additional weight portions 124e, the center additional weight portion 124c, and the wall-like additional weight portions 124w are constituted by causing the two weights 120B constituting the mass body 12B to project toward each other. This enables the additional weight portions 124e, the center additional weight portion 124c, and the wall-like additional weight portions 124w to be added to the mass body 12B without increasing the number of parts. It should be noted, however, that the additional weight portions 124e, the center additional weight portion 124c, and the wall-like additional weight portions 124w may be constituted by causing one of the two weights 120B constituting the mass body 12B to project toward the other.

In the case where the centrifugal-pendulum vibration absorbing device 10B configured as discussed above is applied to the starting device 1, the same function and effect as those obtained with the starting device 1 including the centrifugal-pendulum vibration absorbing device 10 discussed above can be obtained. It is a matter of course, however, that also in the centrifugal-pendulum vibration absorbing device 10B, protrusions that project in the axial direction of the input shaft 20 toward the support member 11B may be formed on a surface of the weight 120B disposed on the lock-up piston 90 side, which faces the support member 11B.

In the embodiment etc. described above, the starting device 1 including the front cover 3, the pump impeller 4, the turbine runner 5, the damper mechanism 8, the lock-up clutch mechanism 9, and so forth corresponds to the "starting device", the centrifugal-pendulum vibration absorbing device 10, 10B including the support member 11, 11B coupled to the damper mechanism 8 serving as a rotary element, the plurality of mass bodies 12, 12B swingably supported by the support member 11, 11B, and the guide rollers 127 which roll on the inner peripheral surface of the guide opening portions 115a, 115b of the support member 11, 11B and the guide opening portions 125a, 125b of the mass bodies 12, 12B corresponds to the "centrifugal-pendulum vibration absorbing device", and the weight support protrusions 117a, 117b correspond to the "protrusion".

While an exemplary embodiment has been described above, it is a matter of course that the subject matter described herein is not limited to the embodiment described above in any way, and that the described starting device may be modified in various ways without departing from the scope and sprit thereof.

INDUSTRIAL APPLICABILITY

The subject matter described herein can be utilized in the manufacturing industry for centrifugal-pendulum vibration absorbing devices and starting devices.

The invention claimed is:
1. A starting device comprising:
a front cover coupled to a motor of a vehicle;
a pump impeller joined to the front cover;
a turbine runner disposed to face the pump impeller and coupled to an input shaft of a transmission;
a lock-up clutch having a lock-up piston that defines a lock-up chamber together with the front cover;
a damper mechanism including an input element that is coupled to the lock-up piston and that defines a clutch engagement chamber that opposes the lock-up chamber together with the lock-up piston, an output element coupled to the input shaft of the transmission, and a spring disposed between the input element and the output element; and
a centrifugal-pendulum vibration absorbing device disposed in the clutch engagement chamber and coupled to the damper mechanism, wherein:
the lock-up clutch engages and disengages the front cover and the input element of the damper mechanism with and from each other in accordance with a pressure difference between a clutch disengagement pressure supplied to the lock-up chamber and a clutch engagement pressure regulated independently of the clutch disengagement pressure and supplied to the clutch engagement chamber;
a gap that allows a working fluid from the lock-up chamber to flow into the lock-up engagement chamber is formed at a coupling portion between the lock-up piston and the input element;
the damper mechanism is disposed on the turbine runner side with respect to the centrifugal-pendulum vibration absorbing device and the gap;

the centrifugal-pendulum vibration absorbing device includes a support member that is coupled to the damper mechanism and that extends in parallel with a clutch engagement chamber side-surface of the lock-up piston, multiple mass bodies each including two weights that face each other via the support member and that are coupled to each other, and a guide roller that rolls on inner peripheral surfaces of a first notch portion formed in the support member and a weight-side notch portion formed in the weight;

one of the support member and the weight disposed on the lock-up piston side has a protrusion that projects toward the other in an axial direction of the input shaft; and the support member and the weight disposed on the damper mechanism side do not have another protrusion that projects in the axial direction at a position that is symmetrical with respect to the protrusion about a plane that is orthogonal to an axis of the input shaft and that passes through a center, in a thickness direction, of a portion of the support member interposed between the two weights.

2. The starting device according to claim 1, wherein the protrusion is provided on the support member so as to project toward the weight disposed on the lock-up piston side.

3. The starting device according to claim 2, wherein:

the first notch portion of the support member has a larger opening area than the weight-side notch portion of the weight; and the protrusion projects toward the weight disposed on the lock-up piston side at a location on a circumferential end portion side of the mass body with respect to the first notch portion.

4. The starting device according to claim 2, wherein:

two guide rollers are provided for each of the mass bodies, and spaced from each other;

two first notch portions are provided for each of the mass bodies, and disposed symmetrically about a swing center line of the mass body;

a plurality of recessed portions that are depressed toward a center of the support member are formed in the support member so as to interpose the two first notch portions for each of the mass bodies; and the protrusion projects toward the weight disposed on the lock-up piston side from a location between the first notch portion and the recessed portion.

5. The starting device according to claim 2:

two guide rollers are provided for each of the mass bodies, and spaced from each other;

two first notch portions are provided for each of the mass bodies, and disposed symmetrically about a swing center line of the mass body;

a plurality of recessed portions that are depressed toward a center of the support member are formed in the support member so as to interpose the two first notch portions for each of the mass bodies; and the protrusion projects toward the weight disposed on the lock-up piston side from a location between the first notch portion and the recessed portion.

6. The starting device according to claim 1, wherein:

the mass bodies each include a coupling member that couples the two weights to each other and that has a cushioning member;

the support member includes a second notch portion that permits movement of the coupling member and that abuts against the cushioning member of the coupling member to determine a swing range of the mass body; and the protrusion projects toward the weight disposed on the lock-up piston side from a location between the first notch portion and the second notch portion.

7. The starting device according to claim 6, wherein the protrusion is disposed in closer proximity to the second notch portion than the first notch portion.

8. The starting device according to claim 6, wherein:

two guide rollers are provided for each of the mass bodies, and spaced from each other;

two coupling members are provided for each of the mass bodies, and positioned on both sides of the two guide rollers;

two first notch portions are provided for each of the mass bodies, and disposed symmetrically about a swing center line of the mass body; and two second notch portions are provided for each of the mass bodies, and positioned on both sides of the two first notch portions.

9. The starting device according to claim 6, wherein:

two guide rollers are provided for each of the mass bodies, and spaced from each other;

two coupling members are provided for each of the mass bodies, and positioned on both sides of the two guide rollers;

two first notch portions are provided for each of the mass bodies, and disposed symmetrically about a swing center line of the mass body; and two second notch portions are provided for each of the mass bodies, and positioned on both sides of the two first notch portions.

* * * * *